US009769552B2

(12) United States Patent
Choisel et al.

(10) Patent No.: US 9,769,552 B2
(45) Date of Patent: Sep. 19, 2017

(54) METHOD AND APPARATUS FOR ESTIMATING TALKER DISTANCE

(71) Applicant: Apple Inc., Cupertino, CA (US)

(72) Inventors: Sylvain J. Choisel, Cupertino, CA (US); Martin E. Johnson, Los Gatos, CA (US); Afrooz Family, Emerald Hills, CA (US)

(73) Assignee: APPLE INC., Cupertino, CA (US)

(*) Notice: Subject to any disclaimer, the term of this patent is extended or adjusted under 35 U.S.C. 154(b) by 0 days.

(21) Appl. No.: 14/463,596

(22) Filed: Aug. 19, 2014

(65) Prior Publication Data

US 2016/0057522 A1 Feb. 25, 2016

(51) Int. Cl.
*H04R 1/08* (2006.01)
*G01S 3/803* (2006.01)
*H04R 3/00* (2006.01)
*G01S 5/28* (2006.01)

(52) U.S. Cl.
CPC ............... *H04R 1/08* (2013.01); *G01S 3/803* (2013.01); *G01S 5/28* (2013.01); *H04R 3/005* (2013.01)

(58) Field of Classification Search
None
See application file for complete search history.

(56) References Cited

U.S. PATENT DOCUMENTS

| 4,130,023 A * | 12/1978 | Henricksen | H04R 29/001 73/647 |
| 6,219,645 B1 | 4/2001 | Byers | |
| 6,593,956 B1 | 7/2003 | Potts et al. | |
| 7,116,792 B1 * | 10/2006 | Taenzer | H04R 3/005 381/313 |
| 2003/0126013 A1 | 7/2003 | Shand | |

(Continued)

FOREIGN PATENT DOCUMENTS

| EP | 1116961 | 7/2001 |
| EP | 1544635 | 8/2003 |

OTHER PUBLICATIONS

International Search Report and Written Opinion, dated Oct. 14, 2015, Application No. PCT/US2015/042519.

(Continued)

*Primary Examiner* — Peter Vincent Agustin
(74) *Attorney, Agent, or Firm* — Blakely Sokoloff Taylor & Zafman LLP

(57) ABSTRACT

An audio capture device generates two microphone beam patterns with different directivity indices. The audio capture device may determine the position of a user relative to the audio capture device based on sounds detected by the separate microphone beam patterns. Accordingly, the audio capture device allows the determination of the position of the user without the complexity and cost of using a dedicated listening device and/or a camera. In particular, the audio capture device does not need to be immediately proximate to the user (e.g., held near the ear of the user) and may be used to immediately provide other services to the user (e.g., audio/video playback, telephony functions, etc.). The position of the user may include the measured distance between the audio capture device and the user, the proximity of the user relative to another device/object, and/or the orientation of the user relative to the audio capture device.

24 Claims, 10 Drawing Sheets

(56) References Cited

U.S. PATENT DOCUMENTS

| | | | |
|---|---|---|---|
| 2003/0142836 A1* | 7/2003 | Warren | H04R 25/407 381/92 |
| 2006/0136544 A1* | 6/2006 | Atsmon | G01S 5/22 709/200 |
| 2008/0199024 A1* | 8/2008 | Nakadai | H04S 7/00 381/92 |
| 2008/0226098 A1* | 9/2008 | Haulick | G10L 21/0208 381/94.9 |
| 2009/0010455 A1* | 1/2009 | Suzuki | H04R 1/403 381/97 |
| 2009/0055180 A1* | 2/2009 | Coon | B60R 16/0373 704/251 |
| 2009/0316918 A1* | 12/2009 | Niemisto | H04R 29/00 381/58 |
| 2010/0020951 A1* | 1/2010 | Basart | H04M 15/06 379/142.01 |
| 2010/0030838 A1* | 2/2010 | Atsmon | A63H 3/28 709/200 |
| 2010/0128895 A1* | 5/2010 | Matsuo | G10L 21/0208 381/92 |
| 2013/0136273 A1 | 5/2013 | Marash et al. | |
| 2013/0190041 A1* | 7/2013 | Andrews | H04R 3/005 455/556.1 |
| 2014/0039888 A1 | 2/2014 | Taubman et al. | |

OTHER PUBLICATIONS

International Preliminary Report on Patentability for PCT/US2015/042519, dated Mar. 2, 2017, 8 pages.

* cited by examiner

METHOD AND APPARATUS FOR ESTIMATING TALKER DISTANCE

FIELD

A system and method for estimating the distance between a microphone array and a user/talker using a set of microphone beams is described. Other embodiments are also described.

BACKGROUND

It is often useful to know the location of a user/talker relative to the boundaries of a room (e.g., walls) or relative to a device (e.g., a computer or loudspeaker). For example, this location information may be utilized for optimizing audio-visual rendering by a computing device. Traditionally, user location has been determined using one or more of 1) video tracking of the user and 2) acoustic triangulation using time of flight or signal strength of either radio or acoustic waves emitted or received by a device proximate to the user. However, both of these techniques suffer from complexity and coverage issues. In particular, video tracking can be costly and often has a limited coverage area while acoustic triangulation requires the user to carry an active device that emits and/or receives radio or acoustic waves.

SUMMARY

In one embodiment, an audio capture device generates two microphone beam patterns with different directivity indices. The microphone beam patterns may be generated by a microphone array integrated within or otherwise coupled to the audio capture device (e.g., wired or wireless connections). Each of the beam patterns may detect sound produced by a user.

The audio capture device may determine the distance r separating the audio capture device/microphone array and the user using the sounds detected by the separate microphone beam patterns. Accordingly, the audio capture device allows the determination of the distance r without the complexity and cost of using a dedicated listening device and/or a camera. In particular, traditional acoustic measurement tools require two separate devices (e.g., a sound emitting device and a listening device). In contrast to these techniques, the above system and method allows the use of a single device (i.e., the audio capture device) that works in conjunction with sound produced by the user. Accordingly, the audio capture device does not need to be immediately proximate to the user (e.g., held near the ear of the user) and may be used to immediately provide other services to the user (e.g., audio/video playback, telephony functions, etc.).

Although described as a quantified distance value, in other embodiments the value of r may be used to determine general positioning of the user. For example, the value of r may be used to generally determine whether the user is proximate to the audio capture device or another object and/or the orientation of the user relative to the audio capture device (e.g., whether the user is speaking directly at the audio capture device).

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments are described with reference to the appended drawings. While numerous details are set forth, it is understood that some embodiments of the invention may be practiced without these details. In other instances, well-known circuits, structures, and techniques have not been shown in detail so as not to obscure the understanding of this description.

Figure 1:
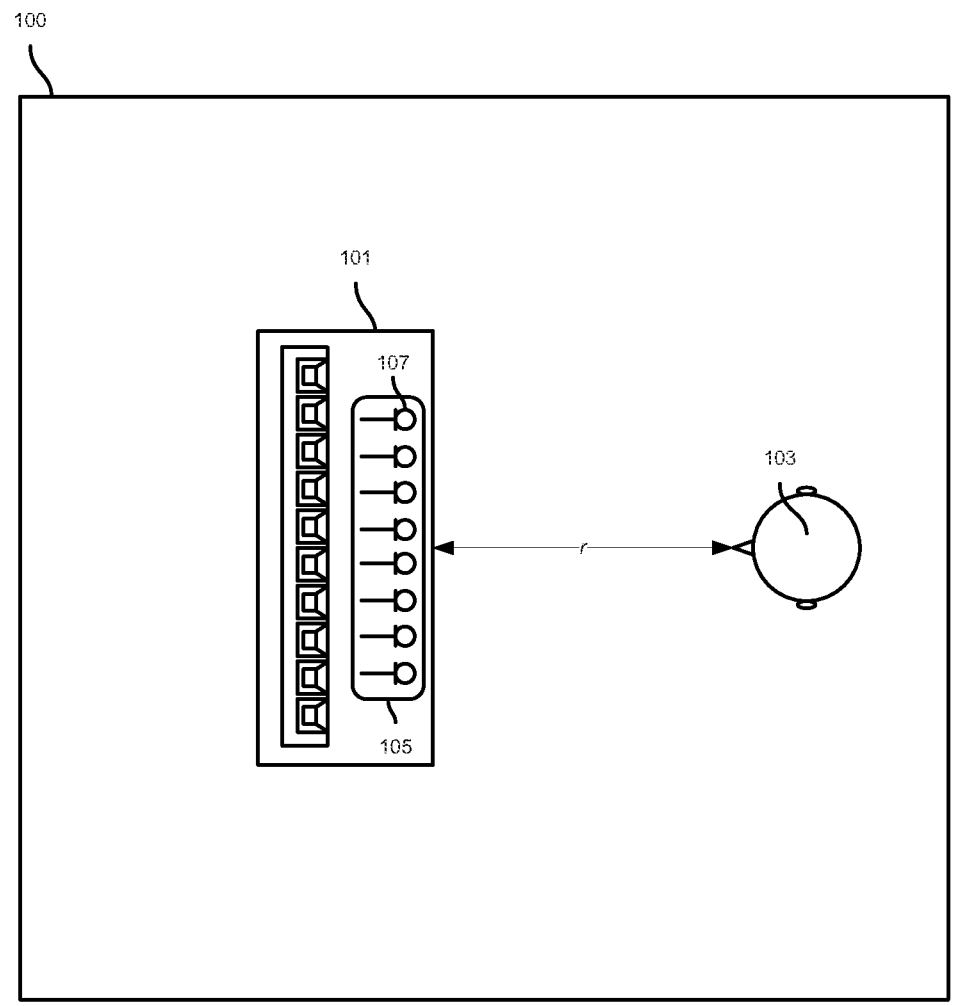
FIG. 1 shows an audio capture device that captures sound from a user in a listening area according to one embodiment.

FIG. 1 shows an audio capture device 101 that captures sound from a user 103. As shown, the audio capture device 101 may include a microphone array 105 that includes a plurality of microphones 107 for capturing sound emitted by the user 103. As will be described in greater detail below, the audio capture device 101 may estimate/determine the distance r between the user 103 and the audio capture device 101/the microphone array 105 through the use of multiple microphone beam patterns with different directivity indexes. This estimated distance r may thereafter be used for adjusting one or more settings on the audio capture device 101 and/or another computing device.

In some embodiments, as described above, the value of r may be a distance value (e.g., a value in meters), which quantifies the specific distance separating the user 103 and the audio capture device 101/the microphone array 105. However, in other embodiments, as will be discussed in greater detail below, the value of r may be used to generally determine the location and/or orientation of the user 103 relative to the audio capture device 101/the microphone array 105. For example, the value for r may be used to determine 1) whether the user 103 is proximate to the audio capture device 101/the microphone array 105 and/or proximate to another device; 2) whether the user 103 is located in a specific area of the listening area 100 (e.g., located at a kitchen table or located on a couch); and/or 3) whether the user 103 is facing and/or on axis with the audio capture device 101/the microphone array 105. Accordingly, the value of r may be used to determine various pieces of location and orientation data for the user 103 with different levels of accuracy and/or granularity.

As shown in FIG. 1, the audio capture device 101 and the user 103 may be located in a listening area 100. The listening area 100 may be a room of any size within a house, commercial establishment, or any other structure. For example, the listening area 100 may be a home office of the user 103.

Figure 2:
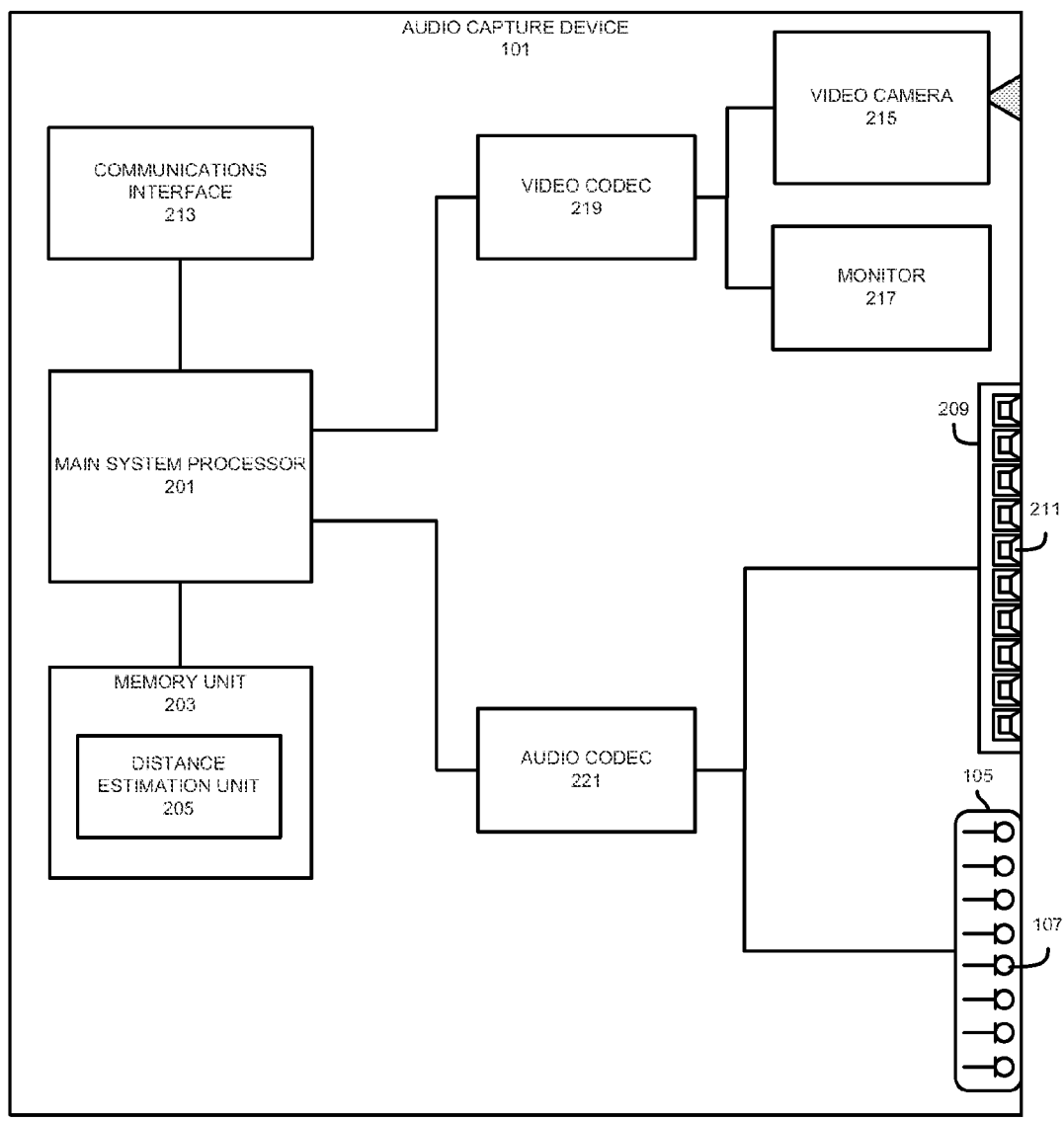
FIG. 2 shows a component diagram of the audio capture device according to one embodiment.

FIG. 2 shows a component diagram of the audio capture device 101 according to one embodiment. The audio capture device 101 may be any computing system that is capable of capturing sound from the user 103. For example, the audio capture device 101 may be a laptop computer, a desktop computer, a tablet computer, a video conferencing phone, a set-top box, a multimedia player, a gaming system, and/or a mobile device (e.g., cellular telephone or mobile media player). In some embodiments, the audio capture device 101 may be capable of outputting audio and video for the user 103. As will be described in greater detail below, the audio capture device 101 may estimate/determine the distance r between the user 103 and the audio capture device 101/the microphone array 105 and based on this determined distance r, adjust parameters or settings of the audio capture device 101 and/or another device. Each element of the audio capture device 101 shown in FIG. 2 will now be described.

The audio capture device 101 may include a main system processor 201 and a memory unit 203. The processor 201 and memory unit 203 are generically used here to refer to any suitable combination of programmable data processing components and data storage that conduct the operations needed to implement the various functions and operations of the audio capture device 101. The processor 201 may be a special purpose processor such as an application-specific integrated circuit (ASIC), a general purpose microprocessor, a field-programmable gate array (FPGA), a digital signal controller, or a set of hardware logic structures (e.g., filters, arithmetic logic units, and dedicated state machines) while the memory unit 203 may refer to microelectronic, non-volatile random access memory. An operating system may be stored in the memory unit 203, along with application programs specific to the various functions of the audio capture device 101, which are to be run or executed by the processor 201 to perform the various functions of the audio capture device 101. For example, the memory unit 203 may include a distance estimation unit 205, which in conjunction with other hardware and software elements of the audio capture device 101, estimates the distance R between the audio capture device 101/the microphone array 105 and the user 103 as will be described in further detail below.

As noted above, in one embodiment, the audio capture device 101 may include a microphone array 105. The microphone array 105 may be composed of two or more microphones 107 that sense sounds and convert these sensed sounds into electrical signals. The microphones 107 may be any type of acoustic-to-electric transducer or sensor, including a MicroElectrical-Mechanical System (MEMS) microphone, a piezoelectric microphone, an electret condenser microphone, or a dynamic microphone. The microphones 107 in the microphone array 105 may utilize various filters that can control gain and phase across a range of frequencies (including possible use of delays) to provide a range of polar patterns, such as cardioid, omnidirectional, and figure-eight. The generated polar patterns alter the direction and area of sound captured in the vicinity of the audio capture device 101. In one embodiment, the polar patterns of the microphones 107 may vary continuously over time.

Figure 3A:
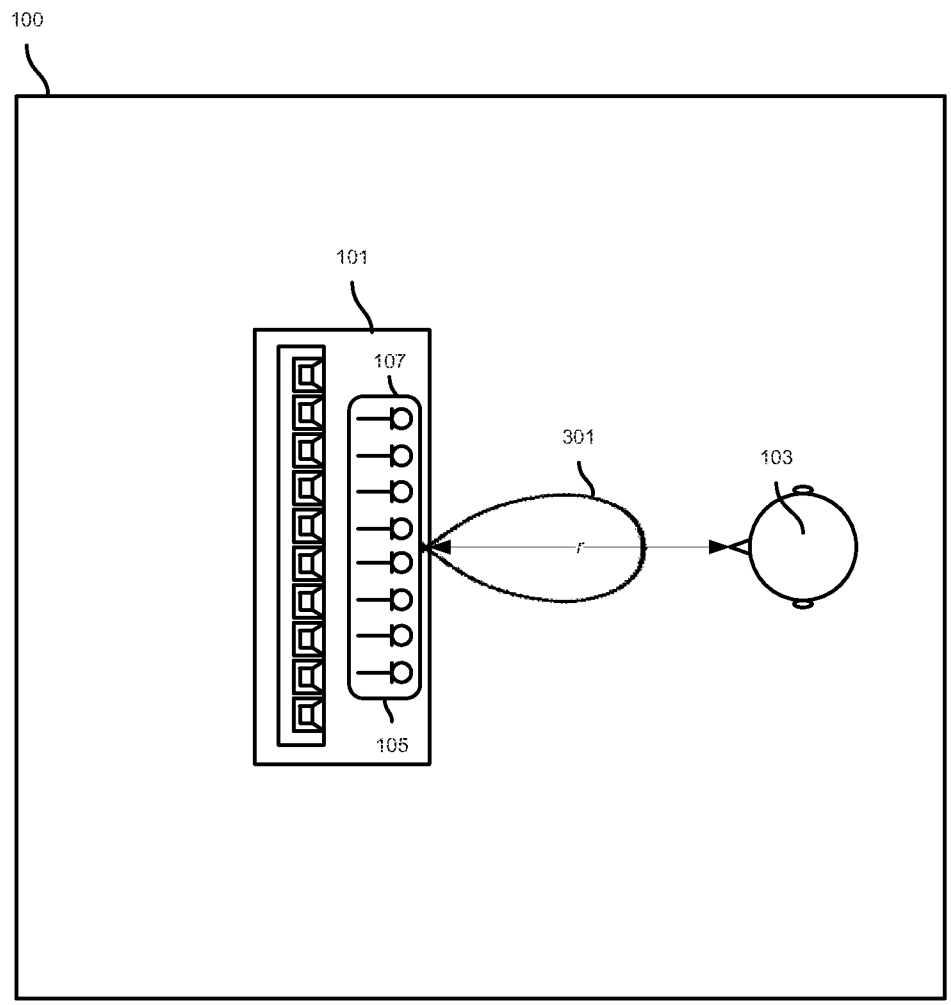
FIG. 3A shows the audio capture device generating a first microphone beam to capture sound produced by the user according to one embodiment.
Figure 3B:
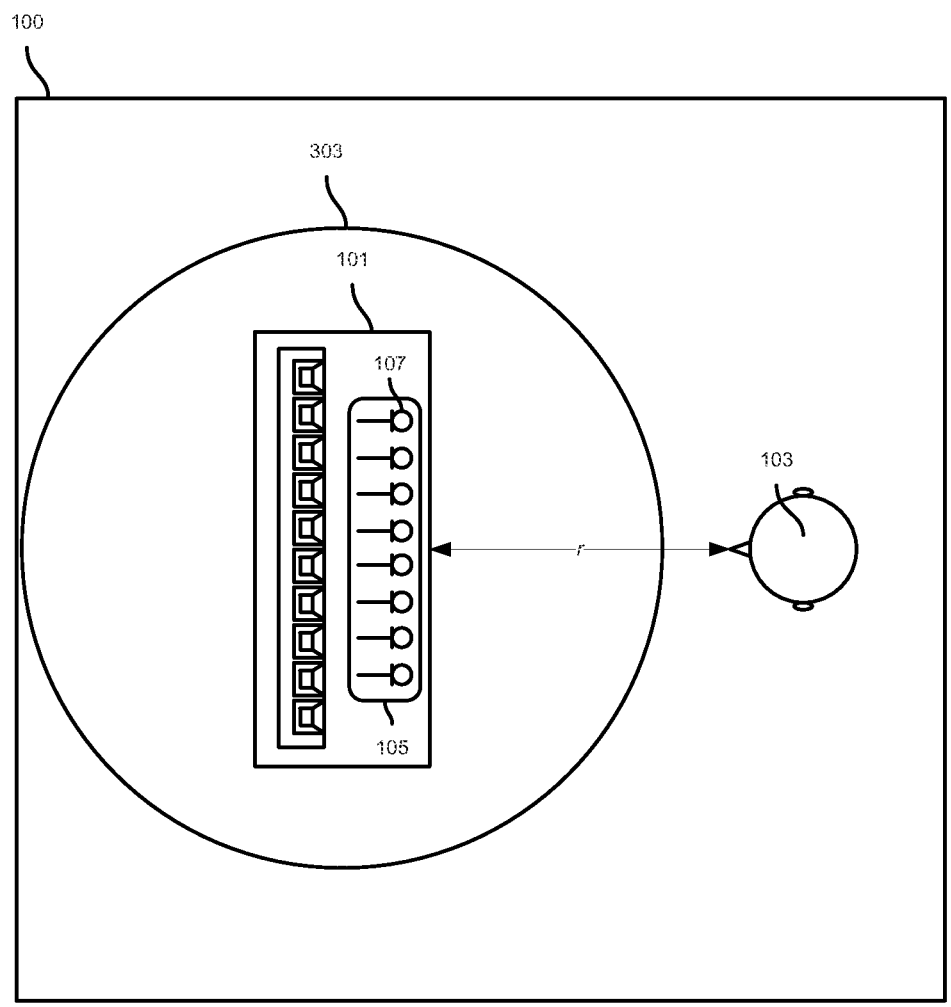
FIG. 3B shows the audio capture device generating a second microphone beam to capture sound produced by the user according to one embodiment.
Figure 3C:
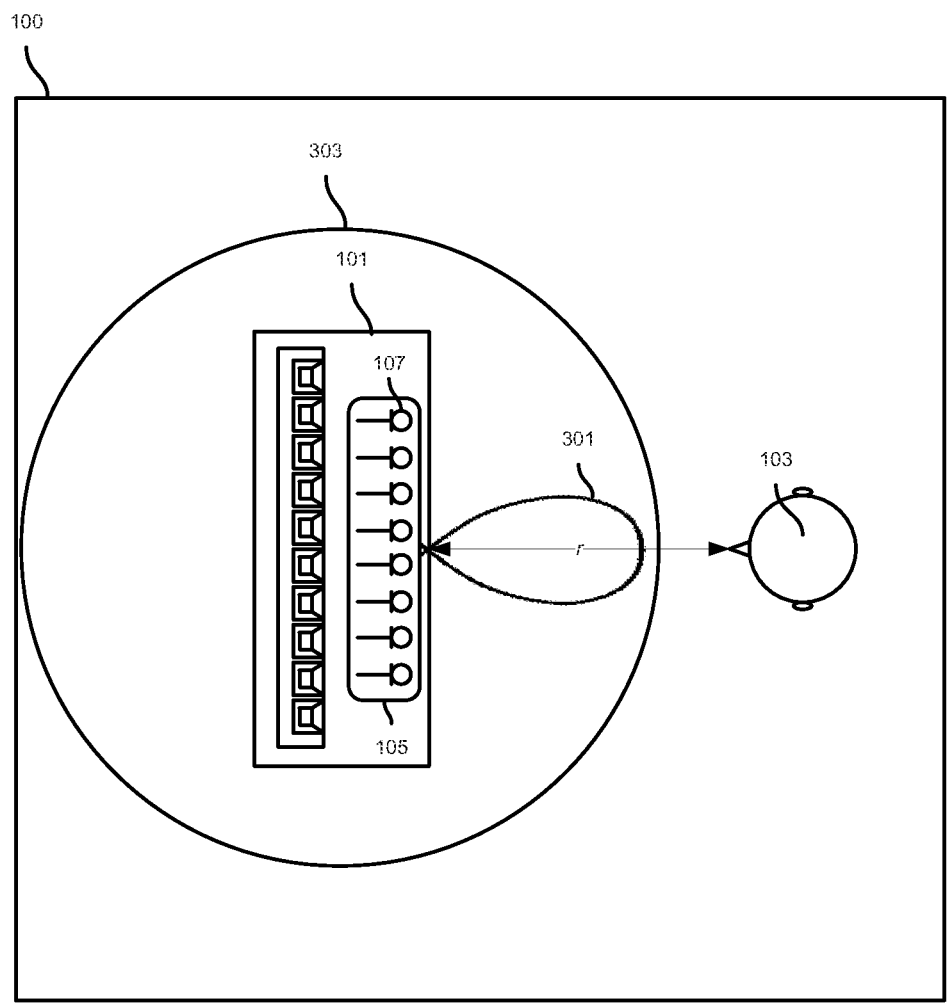
FIG. 3C shows the audio capture device simultaneously generating the first and second microphone beams to capture sound produced by the user according to one embodiment.

As shown in FIG. 3A and described in further detail below, the microphone array 105 may utilize a narrowly focused beam pattern 301 with a relatively high directivity or as shown in FIG. 3B, the microphone array 105 may utilize a wide beam pattern 303 with a comparatively low directivity. In one embodiment, these beam patterns 301 and 303 may be simultaneously generated by the audio capture device 101 as shown in FIG. 3C. Although the directivity indices of the beam patterns 301 and 303 may be different, the beam patterns may have similar or identical sensitivities on axis (i.e., in the look direction). Accordingly, each of the beam patterns 301 and 303 may simultaneously pick up sound produced by the user 103. As will be described in greater detail below, sounds picked-up by the beam patterns 301 and 303 may be used to estimate the distance r between the user 103 from the audio capture device 101 and/or the microphone array 105.

Although shown as including one microphone array 105, the audio capture device 101 may include any number of microphone arrays 105. Hereinafter, the audio capture device 101 will be described as including a single microphone array 105; however, as described above, it is understood that the audio capture device 101 may operate in a similar fashion with multiple microphone arrays 105.

In one embodiment, the audio capture device 101 may include a speaker 209 for outputting sound. As shown in FIG. 2, the speaker 209 may include multiple transducers 211 housed in a single cabinet. In this example, the speaker 209 has ten distinct transducers 211 evenly aligned in a row within a cabinet. Although shown as aligned is a flat plane or straight line, the transducers 211 may be aligned in a curved fashion along an arc. In other embodiments, different numbers of transducers 211 may be used with uniform or non-uniform spacing and alignment. For example, in some embodiments, a single transducer 211 may be installed in the speaker 209.

The transducers 211 may be any combination of full-range drivers, mid-range drivers, subwoofers, woofers, and tweeters. Each of the transducers 211 may use a lightweight diaphragm, or cone, connected to a rigid basket, or frame, via a flexible suspension that constrains a coil of wire (e.g., a voice coil) to move axially through a cylindrical magnetic gap. When an electrical audio signal is applied to the voice coil, a magnetic field is created by the electric current in the voice coil, making it a variable electromagnet. The coil and the transducers' 211 magnetic system interact, generating a mechanical force that causes the coil (and thus, the attached cone) to move back and forth, thereby reproducing sound under the control of the applied electrical audio signal coming from a source.

Each transducer 211 may be individually and separately driven to produce sound in response to separate and discrete audio signals. By allowing the transducers 211 in the speaker 209 to be individually and separately driven according to different parameters and settings (including filters which control delays, amplitude variations, and phase variations across the audio frequency range), the speaker 209 may produce numerous directivity patterns to simulate or better represent respective channels of sound program content played to the user 103.

Although shown as including one speaker 209, the audio capture device 101 may include any number of speakers 209. Hereinafter, the audio capture device 101 will be described as including a single speaker 209; however, as described above, it is understood that the audio capture device 101 may operate in a similar fashion with multiple speakers 209.

In one embodiment, the audio capture device 101 may include a communications interface 213 for communicating with other components over one or more connections. For example, the communications interface 213 may be capable of communicating using Bluetooth, the IEEE 802.11x suite of standards, IEEE 802.3, cellular Global System for Mobile Communications (GSM), cellular Code Division Multiple Access (CDMA), and/or Long Term Evolution (LTE). In one embodiment, the communications interface 213 facilitates the transmission/reception of video, audio, and other pieces of data.

The audio capture device 101 may include a video camera 215 to capture scenes proximate to the audio capture device 101. The video camera 215 may be any type of video capture device, including units that use charge-couple device (CCD) and/or complementary metal-oxide-semiconductor (CMOS) active pixel sensors.

In one embodiment, the video camera 215 may be capable of zooming in on a particular area proximate to the audio capture device 101. For example, the video camera 215 may be equipped with a zoom lens, which is a mechanical assembly of lens elements for which the focal length (and thus angle of view) can be varied. Alternatively or in addition to a mechanical zoom lens, the video camera 215 may be equipped with a digital zooming device, which decreases (narrows) the apparent angle of view of video captured by the video camera 215 by cropping the video to be centered on a desired segment of the captured video image. Through interpolation, this digital cropping generates a processed video image with the same aspect ratio as the original video.

In one embodiment, the audio capture device 101 may include a monitor 217 for displaying video. The monitor 217 may utilize any display technology, including a liquid crystal display (LCD) panel, a plasma display panel, and/or an organic light emitting diode (OLED) display panel.

In one embodiment, the audio capture device 101 may include a video codec 219 for processing video signals. For example, the video codec 219 may process video signals received from the video camera 215 and video signals to be displayed on the monitor 217. The processing may include antialiasing, up-conversion, down-conversion, de-noising, and/or digital cropping/zooming.

In one embodiment, the audio capture device 101 may include an audio codec 221 for managing digital and analog audio signals. For example, the audio codec 221 may manage input audio signals received from the one or more microphones 107 in the microphone array 105 coupled to the audio codec 221. Management of audio signals received from the microphones 107 may include analog-to-digital conversion, echo cancellation, and general signal processing. Similarly, the audio codec 221 may manage audio signals for driving each transducer 211 in the speaker 209.

Although shown as integrated within the same casing as other components of the audio capture device 101, in some embodiments one or more of the microphone array 105, the speaker 209, the video camera 215, and the monitor 217 may be separate and coupled to the other components of the audio capture device 101 through wired or wireless connections. For example, one or more of the microphone array 105, the speaker 209, the video camera 215, and the monitor 217 may be coupled to other components of the audio capture device 101 through the communications interface 213.

Figure 4:
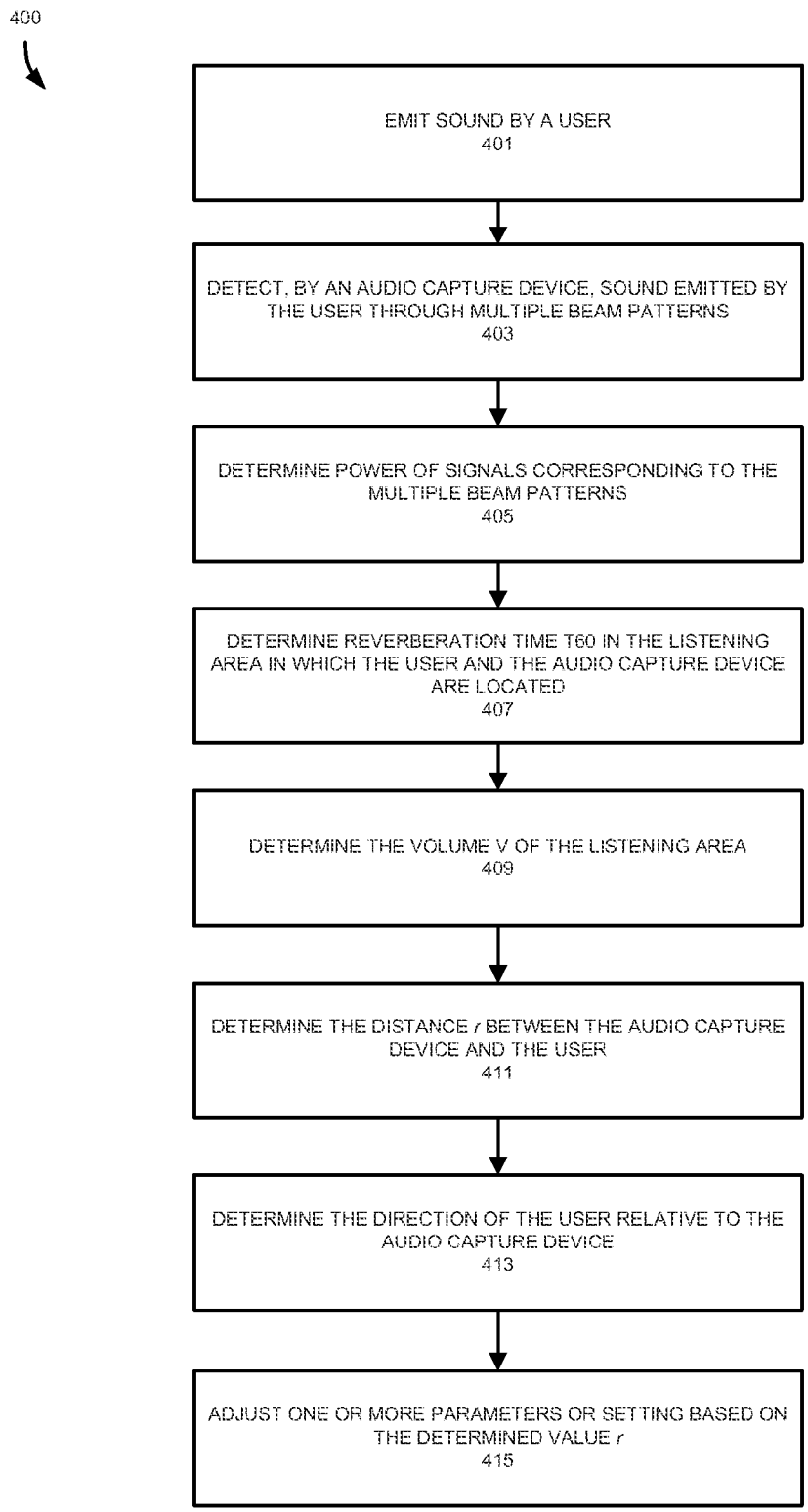
FIG. 4 shows a method for determining the positioning of the user according to one embodiment.
Figure 7:
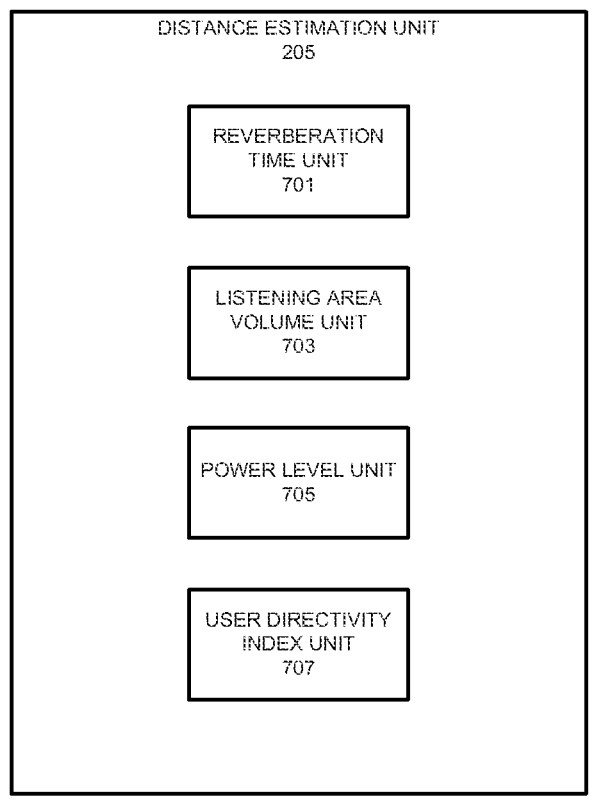
FIG. 7 shows a component diagram of a distance estimation unit according to one embodiment.

As noted above, the memory unit 203 may store a distance estimation unit 205, which estimates the distance r between the audio capture device 101/the microphone array 105 and the user 103. FIG. 4 shows a method 400 for estimating the distance r between the audio capture device 101/the microphone array 105 and the user 103 according to one embodiment of the invention. The method 400 may be performed by one or more components of the audio capture device 101. For example, according to one embodiment, the operations may be performed by the distance estimation unit 205 in conjunction (as further shown in FIG. 7) with audio inputs received from one or more of the microphones 107 in the microphone array 105. Although described in relation to distance between the user 103 and the audio capture device 101/the microphone array 105, the value r may be used to generally determine the positioning of the user 103 relative to one or more objects or devices. For example, the value r may be used to determine general proximity of the user 103 to one or more objects and/or the orientation of the user 103 relative to the audio capture device 101. Each operation of the method 400 will be described by way of example below.

Although the operations in the method 400 are shown and described in a particular order, in other embodiments, the operations may be performed in another order. For example, in some embodiments, one or more of the operations in the method may be performed simultaneously or during overlapping time periods.

The method 400 may commence at operation 401 with the user 103 emitting sound. For example, the user 103 may utter a voice command to the audio capture device 101 (e.g., "System, please play music" or "System, please call Megan"). However, in other embodiments, the sound emitted at operation 401 may be based on a conversation with another individual and not directed at the audio capture device 101. For example, the user 103 may be communicating with another person in the vicinity of the audio capture device 101 and/or located at a remote location (e.g., communicating over a telephone connection).

Although described as sound emitted by a human user 103, in other embodiments, the sound emitted at operation 401 may be from any audio source for which the directivity index for the sound is known or is measurable.

Following the user 103 emitting sound at operation 401, at operation 403 the microphone array 105 may detect the emitted sound using two or more microphone beam patterns. For example, as shown in FIG. 3C, the microphone array 105 may simultaneously generate the beam patterns 301 and 303 for capturing sound generated by the user 103. In this embodiment, the directivity indexes of the beam patterns 301 and 303 are different. In particular, the directivity index for the beam pattern 301 is $DI_1$ while the directivity index for the beam pattern 305 is $DI_2$, where $DI_1 > DI_2$. For example, $DI_1$ may be 16 dB while $DI_2$ may be 0 dB. The beam patterns 301 and 303 may correspond to the signals $S_1$ and $S_2$, respectively. The signals $S_1$ and $S_2$ represent sound captured by each of these beam patterns 301 and 303, respectively. Although the directivity indices $DI_1$ and $DI_2$ of the beam patterns 301 and 303 are different, the beam patterns may have similar or identical sensitivities on axis (i.e., in the look direction).

Following detection of sound at operation 403, operation 405, using the power level unit 705, may determine the power/pressure levels $P_1$ and $P_2$ for each of the signals $S_1$ and $S_2$, respectively. $P_1$ and $P_2$ may be calculated in blocks of audio such that distance r between the audio capture device 101/microphone array 105 and the user 103 may be determined for each individual audio block. This individual measurement of the levels $P_1$ and $P_2$ facilitates the calculation of numerous values for the distance r as described in greater detail below. In one embodiment, post processing may be applied to the plurality of estimates of r. For example, time smoothing and/or weighting based on strength of the signals $S_1$ and $S_2$ and/or voice activity detection in the signals $S_1$ and $S_2$ may be applied as described in greater detail below.

The levels $P_1$ and $P_2$ represent both direct and reverberant sound detected by each of the beam patterns 301 and 303, respectively. While the direct components composing each of $P_1$ and $P_2$ may be similar or identical based on identical sensitivities on axis with the user 103, the reverberant components composing each of $P_1$ and $P_2$ may be different based on the dissimilar shapes of the patterns 301 and 303. In particular, the levels $P_1$ and $P_2$ may be represented by the following equations:

$$P_1 = D + R_1$$

$$P_2 = D + R_2$$

The power levels $P_1$ and $P_2$ may be calculated on either 1) the full bandwidth of human voice, 2) a limited frequency band where the distance r is found to be more accurate, 3) a limited frequency band where the directivity indices and properties of the listening area 100 (e.g., a constant c) are known, and/or 4) several frequency bands to account for the frequency dependency between directivity indices and properties of the listening area 100 (e.g., properties of the listening area 100 defined by a constant c).

At operation 407, the reverberation time $T_{60}$ of the listening area 100 may be calculated using the reverberation time unit 701. $T_{60}$ may be estimated by acoustical measurements and/or input from the user 103. The reverberation time $T_{60}$ is defined as the time required for the level of sound to drop by 60 dB in the listening area 100. In one embodiment, the microphone array 105 may be used to measure the reverberation time $T_{60}$ in the listening area 100. The reverberation time $T_{60}$ does not need to be measured at a particular location in the listening area 100 (e.g., the location of the user 103) or with any particular beam pattern. The reverberation time $T_{60}$ is a property of the listening area 100 and a function of frequency.

The reverberation time $T_{60}$ may be measured using various processes and techniques. In one embodiment, an interrupted noise technique may be used to measure the reverberation time $T_{60}$. In this technique, wide band noise is played and stopped abruptly. With the microphone array 105 and an amplifier connected to a set of constant percentage bandwidth filters such as octave band filters, followed by a set of ac-to-dc converters, which may be average or rms detectors, the decay time from the initial level down to −60 dB is measured. It may be difficult to achieve a full 60 dB of decay, and in some embodiments extrapolation from 20 dB or 30 dB of decay may be used. In one embodiment, the measurement may begin after the first 5 dB of decay.

In one embodiment, a transfer function measurement may be used to measure the reverberation time $T_{60}$. In this technique, a stimulus-response system in which a test signal, such as a linear or log sine chirp, a maximum length stimulus signal, or other noise-like signal, is measured simultaneously in what is being sent and what is being measured with the microphone array 105. The quotient of these two signals is the transfer function. In one embodiment, this transfer function may be made a function of frequency and time and thus is able to make high resolution measurements. The reverberation time $T_{60}$ may be derived from the transfer function. Accuracy may be improved by repeating the measurement sequentially from each of multiple speakers 209 and each of multiple microphone array 105 locations in the listening area 100.

In another embodiment, the reverberation time $T_{60}$ may be estimated based on typical listening area 100 characteristics dynamics. For example, the audio capture device 101 may receive an estimated reverberation time $T_{60}$ from an external device through the communications interface 213. The estimated reverberation time $T_{60}$ may represent an average reverberation time $T_{60}$ for a typical listening area 100.

At operation 409, the geometric volume V of the listening area 100 may be estimated using the listening area volume unit 703. The volume V may be estimated using any technique. For example, the volume V may be estimated using a video/still image capture device (e.g., the video camera 215), acoustical measurements through the use of the speaker 209 and the microphone array 105, input from the user 103, and/or any combination thereof.

Following the calculation of the levels $P_1$ and $P_2$, the reverberation time $T_{60}$, and the volume V, operation 411 may estimate the distance r between the audio capture device 101/microphone array 105 and the user 103. The estimate of the distance r may be based on the power levels $P_1$ and $P_2$, the reverberation time $T_{60}$, and the volume V. For example, the power $P_1$ for the signal $S_1$ corresponding to the beam pattern 301 may be represented by the following equation:

$$P_1 = \frac{1}{r^2} + \frac{c}{(DI_1 \times DI_U)}$$

Similarly, the power $P_2$ for the signal $S_2$ corresponding to the beam pattern 303 may be represented by the following equation:

$$P_2 = \frac{1}{r^2} + \frac{c}{(DI_2 \times DI_U)}$$

In the above equations, r represents the distance between the audio capture device 101/microphone array 105 and the user 103, $DI_u$ is the directivity index of human voice, and c is a constant that describes characteristics of the listening area 100 in which the audio capture device 101 and user 103 are located. The value of $DI_u$ may be calculated as the average directivity index of sound emitted by humans by the user directivity index unit 707. In other embodiments, the value of $DI_u$ may be calculated specifically for the user 103. In one embodiment, the directivity index of human voice $DI_u$ may be predefined/preconfigured during construction or initialization of the audio capture device 101. Accordingly, in this embodiment, the directivity index of human voice $DI_u$ may be retrieved from memory without computation of the value of $DI_u$ during performance of the method 400.

In one embodiment, the constant c may be calculated based on the equation below:

$$c = \frac{100 \times \pi \times T_{60}}{V}$$

As described above, $T_{60}$ is the reverberation time of the listening area 100 in which the audio capture device 101 and the user 103 are located and V is the volume of the listening area 100.

Knowing $P_1$, $P_2$, and c, it follows that r may be represented by the equation below:

$$r = \sqrt{\frac{(P_2 - P_1) \times DI_1 \times DI_2 \times DI_U}{c \times (P_1 \times DI_1 - P_2 \times DI_2)}}$$

Accordingly, in one embodiment, based on the above equation, the distance r may be calculated. For example, power levels $P_1$ and $P_2$ may be 1.5 and 4, respectively, the $DI_1$ and $DI_2$ may be 4 (or 6 dB since $DI_1$ is a power term and uses $10 \log_{10}(x)$) and 1 (or 0 dB), respectively, DIu, which represents the directivity index of the human voice, may be 2 (or 3 dB), and the constant c for the listening area 100 may be 2. Based on these values, the distance r between the audio capture device 101/microphone array 105 and the user 103 may be determined to be 2.24 meters.

Figure 5A:
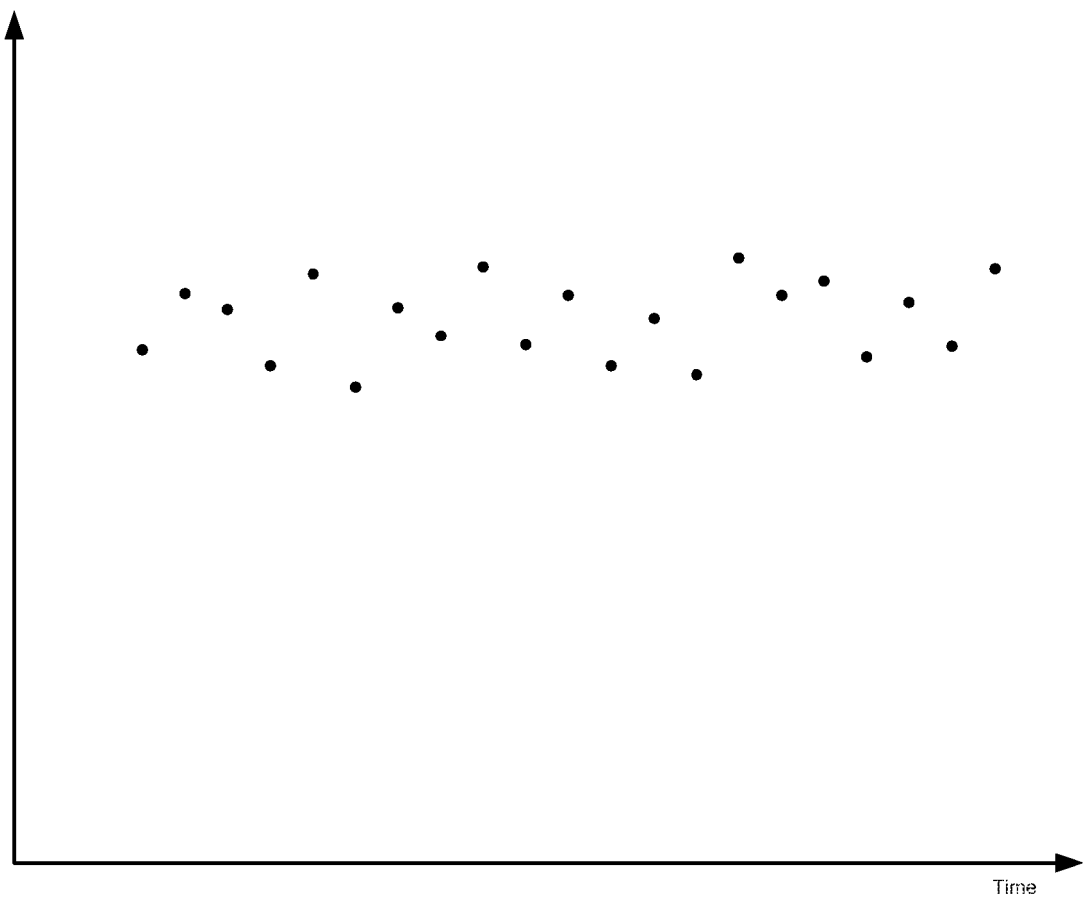
FIG. 5A shows an example dataset of values for r determined for separate blocks of sound produced by the user according to one embodiment.
Figure 5B:
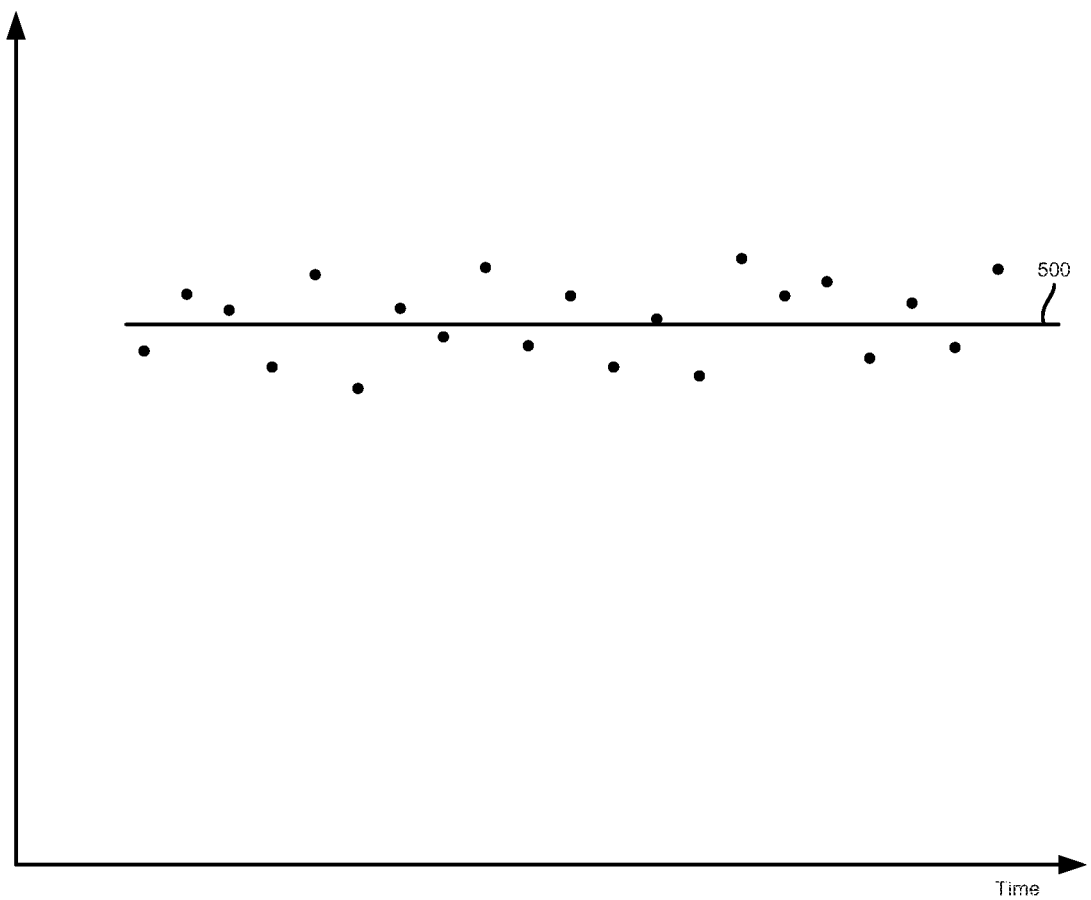
FIG. 5B shows a smoothed value generated for the example dataset of values for r according to one embodiment.

In one embodiment, the method 400 may continually determine values for r for separate segments/blocks of detected sounds from the user 103 as described above. For example, the method 400 may determine values for r over discrete time segments (e.g., 1 ms time segments of detected sound). FIG. 5A shows an example set of values of r for plotted over time. As shown, the values of r may vary even when the user 103 has not moved relative to the audio capture device 101. To generate an estimated value for r, the values computed over time may be smoothed. For example, as shown in FIG. 5B, an average, represented by the line 500, may be computed for the dataset. Accordingly, in this embodiment, the average/smoothed value for r may be used in place of the individual computed values for r.

Although described in relation to a quantifiable distance (e.g., r is represented in meters), the value for r may indicate whether the user 103 is located proximate to the audio capture device 101/microphone array 105 or is distant from the audio capture device 101/microphone array 105. For example, one or more threshold values may be preset to determine the relative proximity of the user 103 in relation to the audio capture device 101/microphone array 105. For instance, a proximity threshold may be preset to the value ten. Upon the computed value for r being less than or equal to the proximity threshold (e.g., r<=10), operation 411 may determine that the user 103 is located proximate to the audio capture device 101/microphone array 105. Conversely, upon the computed value for r being greater than the proximity threshold (e.g., r>10), operation 411 may determine that the user 103 is not located proximate to the audio capture device 101/microphone array 105. In other embodiments, the proximity threshold may be set to indicate whether the user 103 is located within the listening area 100 or outside the listening area 100.

Further, the location of the user 103 may be determined relative to other objects or devices. For example, values for r computed by one or more audio capture devices 101 may be used to estimate the location of the user 103 in the listening area 100. For instance, the value for r may indicate that the user 103 is located in a position in the listening area 100 occupied by a table or a couch. This determination may be based on values of r computed from a single audio capture device 101 or based on values from multiple audio capture devices 101 using triangulation.

Although described in relation to geometrical distance, in some embodiments the value of r may be used to indicate the orientation of the user 103 relative to the audio capture device 101/microphone array 105. For example, an orientation threshold may be preset that indicates whether the user 103 is focused on the audio capture device 101/microphone array 105. Similar to the examples provided above, upon the computed value for r being greater than the orientation threshold, operation 411 may determine that the user 103 is not focused on or is not speaking towards the audio capture device 101/microphone array 105. In this situation, since the user 103 is not speaking towards the audio capture device 101/microphone array 105, the value for r may indicate that the user 103 is far from the audio capture device 101/microphone array 105. However, operation 411 may attribute this apparent distance to the user 103 being turned away from the audio capture device 101/microphone array 105. Conversely, upon the computed value for r being less than or equal to the orientation threshold, operation 411 may determine that the user 103 is focused or is speaking towards the audio capture device 101/microphone array 105.

Although described above with the use of two beam patterns 301 and 303, in other embodiments three or more beam patterns may be used. For example, in one embodiment, operation 403 may detect sound using three or more beam patterns. For instance, two or more of the beams may be focused in different directions. In this embodiment, operation 413 may analyze these differently directed beams to determine an estimated direction of the user 103 relative to the audio capture device 101/microphone array 105. In particular, the beams may be analyzed to determine a beam with the highest pressure/power level. This beam pattern with the highest pressure/power level may be assumed to be the direction of the user 103 relative to the audio capture device 101.

Figure 6:
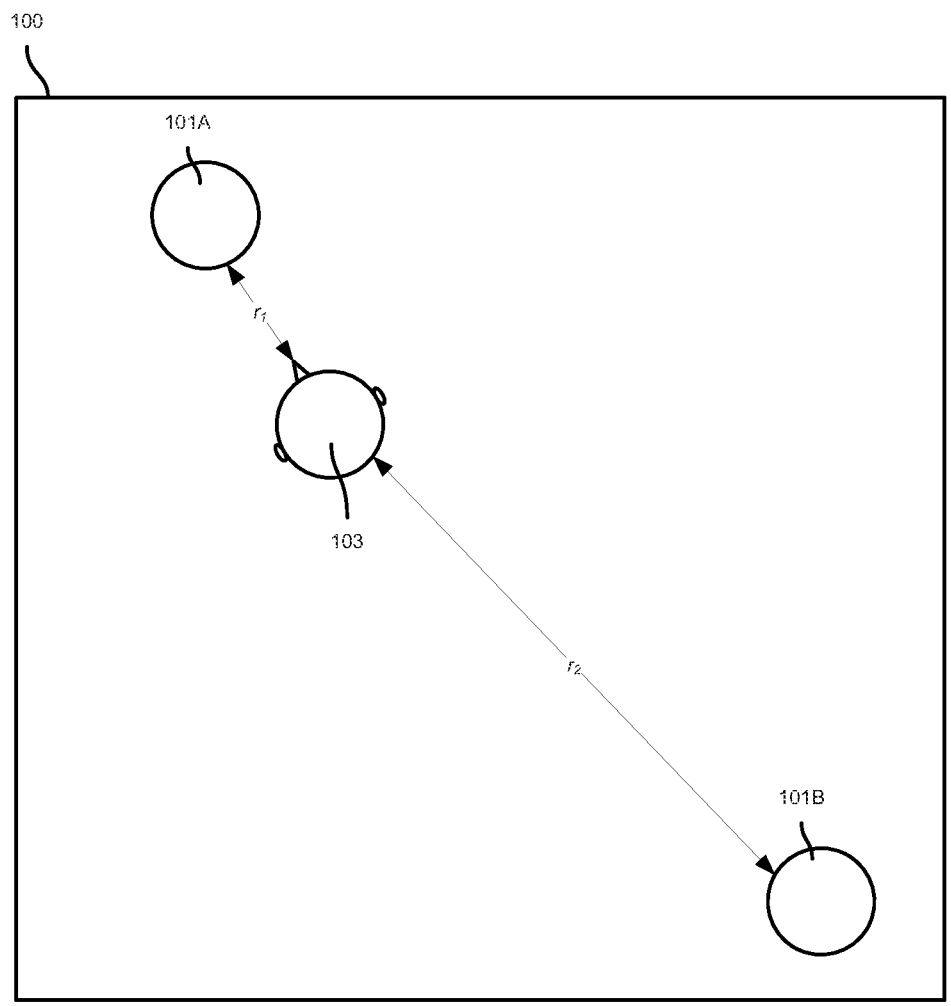
FIG. 6 shows two values for r computed by separate audio capture devices according to one embodiment.

In one embodiment, operation 415 may adjust one or more settings of the audio capture device 101 or another system based on the estimated distance r determined at operation 411 and/or the direction of the user 103 determined at operation 413. For example, the audio capture device 101 may 1) adjust a zoom setting on the camera 215 based on the distance r, 2) adjust speaker beam direction, equalization, volume, and other audio settings based on the distance R, and/or 3) the device responding to a voice command based on the distance r. For example, as shown in FIG. 6, the audio capture devices 101A and 101B may independently perform one or more operations of the method 400 to determine the distance from or the orientation of the user 103 based on the calculated value r. For instance, the method 400 may be performed in relation to voice commands spoken by the user 103. In one embodiment, the devices 101A and 101E may compare values for r to determine 1) whether the user 103 is closer to the device 101A or is closer to the device 101B and/or 2) whether the user 103 is speaking towards the device 101A or the device 101B. On the basis of this determination, the devices 101A and 101B may determine which of devices 101A/101B will handle voice commands emitted by the user 103. For example, upon determining that the value $r_1$ is less than the value $r_2$, the devices 101A and 101B may determine that the user 103 is closer and/or is speaking to the device 101A.

Accordingly, the voice commands spoken by the user 103 are likely directed to this device 101A and will be processed by the device 101A.

Although the above example is described in relation to communication between the devices 101A and 101E to determine which device 101A/101B is to handle voice commands, in other embodiments each device 101A/101B may independently make this determination. For example, the computed values for r generated by each of the devices 101A and 101E may be compared against thresholds as described above to determine whether the commands are intended for each device 101A/101B. On the basis of these comparisons, the devices 101A and 101E may independently determine whether voice commands are to be processed by each corresponding device 101A/101B.

As described above, the method 400 may determine the distance r separating the audio capture device 101/microphone array 105 and the user 103 using sounds detected by microphone beam patterns with different directivity indices. Accordingly, the above method 400 allows the determination of the distance r without the complexity and cost of using a dedicated listening device and/or a camera. In particular, traditional acoustic measurement tools require two separate devices (e.g., a sound emitting device and a listening device). In contrast to these techniques, the above system and method allows the use of a single device (i.e., the audio capture device 101) that works in conjunction with sound produced by the user 103. Accordingly, the audio capture device 101 does not need to be immediately proximate to the user 103 (e.g., held near the ear of the user 103) and may be used to immediately provide other services to the user 103 (e.g., audio/video playback, telephony functions, etc.).

Although described as beamforming using the microphone array 105, in one embodiment the distance r separating the audio capture device 101 and the user 103 may be determined using a plurality of microphones 107 that are not beamformed. In this embodiment, the microphones 107 integrated or otherwise communicatively coupled to the audio capture device 101 may have different directivities based on their placement/location on a diffracting object. For example, a first microphone 107 of the audio capture device 101 may be placed on a spherical cabinet and pointed at the user 101A while a second microphone 107 of the audio capture device 101 may be placed on the spherical cabinet and pointed away from the user 101A. Using the power levels $P_1$ and $P_2$ associated with each of the first and second microphones 107 based on sound detected from the user 101A, the distance r may be computed using the equations discussed above. In this embodiment, the directivity indices $DI_1$ and $DI_2$ may be based on the passive properties of sound diffraction around the spherical cabinet. Accordingly, in this embodiment, the distance r separating the audio capture device 101 and the user 103 may be determined using a plurality of microphones 107 that are not beamformed.

As explained above, an embodiment of the invention may be an article of manufacture in which a machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

What is claimed is:

1. A method for determining positioning of a user in a listening area, comprising:

detecting, by an audio capture device using a first microphone beam pattern generated by the audio capture device, sound produced by the user, as a first beam signal;

detecting, by the audio capture device using a second microphone beam pattern generated by the audio capture device, the sound produced by the user, as a second beam signal, wherein the first beam pattern has a first directivity index and the second beam pattern has a second directivity index that is different from the first directivity index;

determining, by the audio capture device, a first power level of the first beam signal and a second power level of the second beam signal;

determining, by the audio capture device, a plurality of characteristics of the listening area; and computing, by the audio capture device, distance between the user and the audio capture device as a function of the first power level of the first beam signal, the second power level of the second beam signal, the first directivity index, the second directivity index, and the plurality of characteristics of the listening area.

2. The method of claim 1, wherein the computed distance is further a function of a directivity index of the user.

3. The method of claim 1, wherein the computed distance is a first distance, the method further comprising:

identifying a second distance from the user to another device in the listening area; and processing, by the audio capture device, the sound detected from the user in response to determining that the user is closer to the audio capture device than to said another device.

4. The method of claim 1 further comprising determining whether the user is speaking directly at the audio capture device based on the computed distance.

5. The method of claim 4, further comprising:

processing, by the audio capture device, the sound detected from the user in response to determining that the user is speaking directly at the audio capture device.

6. The method of claim 1, wherein the plurality of characteristics of the listening area comprise:

a reverberation time of lithe listening area in which the user and the audio capture device are located; and a geometric volume of the listening area.

7. The method of claim 1 further comprising determining a proximity of the user relative to one or more objects based on the computed distance.

8. The method of claim 1, wherein computing distance between the user and the audio capture device comprises generating a plurality of distance values for separate blocks of the sound produced by the user over time; and smoothing the plurality of distance values generated over time to determine a smoothed distance value.

9. The method of claim 1, further comprising:

selecting the first microphone beam pattern from a plurality of microphone beams generated by the audio capture device based on power levels of beam signals generated by the plurality of microphone beams, wherein the microphone beam in the plurality of microphone beams with a highest power level is selected as the first microphone beam pattern.

10. A system for determining positioning of a user in a listening area, comprising:
an audio capture device to generate a first microphone beam pattern and a second microphone beam pattern, wherein the first microphone beam pattern detects sound as a first beam signal and the second microphone beam pattern detects the sound as a second beam signal, wherein the first microphone beam pattern has a first directivity index and the second microphone beam pattern has a second directivity index that is different from the first directivity index; and
a distance estimation unit to
determine a first power level of the first beam signal and a second power level of the second beam signal,
determine a plurality of characteristics of the listening area, and
compute distance between a sound source and the audio capture device as a function of the first power level of the first beam signal, the second power level of the second beam signal, the first directivity index, the second directivity index, and the set of characteristics of the listening area.

11. The system of claim 10, wherein the plurality of characteristics of the listening area comprise:
a reverberation time of a listening area; and
a geometric volume of the listening area.

12. The system of claim 10, wherein the distance estimation unit further determines a proximity of the user relative to one or more objects based on the computed distance.

13. The system of claim 10, wherein the distance estimation unit further determines whether the user is speaking directly at the audio capture device based on the computed distance.

14. The system of claim 10, wherein the distance estimation unit computes the distance by:
generating a plurality of distance values for separate blocks of the sound over time; and
smoothing the plurality of distance values generated over time to determine a smoothed distance value.

15. The system of claim 10, wherein the computed distance is further a function of a directivity index of the sound source.

16. The system of claim 10, wherein the computed distance is a first distance wherein the audio capture device further identifies a second distance from the sound source to another device in the listening area, wherein the audio capture device processes the sound detected from the sound source in response to determining that the sound source is closer to the audio capture device than to another device based on a comparison between the first and second distances.

17. The system of claim 13, wherein the audio capture device processes the sound detected from the sound source in response to determining that the user is speaking directly at the audio capture device based on the computed distance.

18. The system of claim 10, wherein the audio capture device produces a plurality of microphone beams, wherein the distance estimation unit further selects the first microphone beam pattern from the plurality of microphone beams based on power levels of beam signals generated by the plurality of microphone beams, wherein the microphone beam in the set of microphone beams with a highest power level is selected as the first microphone beam pattern.

19. A non-transitory machine readable medium storing instructions which when executed by a data processing system cause the data processing system to perform a method for determining positioning of a user in a listening area, comprising:
detecting, by an audio capture device using a first microphone beam pattern generated by the audio capture device, sound produced by the user, as a first beam signal;
detecting, by the audio capture device using a second microphone beam pattern generated by the audio capture device, the sound produced by the user, as a second beam signal, wherein the first beam pattern has a first directivity index and the second beam pattern has a second directivity index that is different from the first directivity index;
determining, by the audio capture device, a first power level of the first beam signal and a second power level of the second beam signal;
determining, by the audio capture device, a plurality of characteristics of the listening area; and
computing, by the audio capture device, distance between the user and the audio capture device as a function of the first power level of the first beam signal, the second power level of the second beam signal, the first directivity index, the second directivity index, and the plurality of characteristics of the listening area.

20. The medium of claim 19, wherein the computed distance is further a function of a directivity index of the user.

21. The medium of claim 19, wherein the computed distance is a first distance, the method further comprising:
identifying a second distance from the user to another device in the listening area; and
processing, by the audio capture device, the sound detected from the user in response to determining that the user is closer to the audio capture device than to said another device.

22. The medium of claim 19 further comprising determining whether the user is speaking directly at the audio capture device based on the computed distance.

23. The medium of claim 22, further comprising:
processing, by the audio capture device, the sound detected from the user in response to determining that the user is speaking directly at the audio capture device.

24. The medium of claim 19, wherein the plurality of characteristics of the listening area comprise:
a reverberation time of the listening area in which the user and the audio capture device are located; and
a geometric volume of the listening area.

* * * * *